United States Patent
Pierro

[11] 3,708,251
[45] Jan. 2, 1973

[54] GEARLESS DRIVE METHOD AND MEANS

[75] Inventor: John J. Pierro, Inglewood, Calif.

[73] Assignee: North American Rockwell Corporation

[22] Filed: May 11, 1970

[21] Appl. No.: 29,326

Related U.S. Application Data

[62] Division of Ser. No. 741,676, July 1, 1968, Pat. No. 3,548,965.

[52] U.S. Cl. ................. 417/356, 115/18 E, 310/263
[51] Int. Cl. ..... F04b 17/00, F04b 35/04, B63h 21/26, H02k 1/22
[58] Field of Search ............... 417/356; 310/68, 263; 115/18 E, 34 B

[56] References Cited

UNITED STATES PATENTS

| | | | |
|---|---|---|---|
| 2,697,986 | 12/1954 | Meagher, Jr. | 417/356 |
| 3,422,275 | 1/1969 | Braikevitch et al. | 417/356 X |
| 1,764,388 | 6/1930 | Buchet | 115/18 E |
| 3,143,972 | 8/1964 | Smith et al. | 417/356 |
| 3,303,369 | 2/1967 | Erickson | 310/263 X |

Primary Examiner—William L. Freeh
Assistant Examiner—Gregory La Pointe
Attorney—L. Lee Humphries

[57] ABSTRACT

A synchronous motor has a circular rotating pair of cylindrical pole pieces of claw tooth form connected with propulsion means such as a propeller, and is driven by interaction of magnetic fields produced by segmented modular stator and field windings peripherally situated at spaced locations about the pole pieces energized by polyphase alternating current at a frequency determined by the speed of rotation of the pole pieces relative to the stationary stator and field coils. An additional DC signal is applied to the field windings. For higher power requirements, the number of segmented stator and field coil units can be increased.

2 Claims, 5 Drawing Figures

3,708,251

GEARLESS DRIVE METHOD AND MEANS

This application is a division of application Ser. No. 741,676 filed July 1, 1968, now U.S. Pat. No. 3,548,965 granted Dec. 22, 1970.

SUMMARY OF THE INVENTION

This invention contemplates different forms of use as a propulsion or drive motor, and broadly comprises a vocational synchronous motor provided with stationary stator and field coils operatively related with a cylindrical rotor comprising spaced salient magnetic pole pieces. Separate exitation flux paths through successive pole pieces of the rotor are provided between the field coil and the stator coil. Propulsive force results from the two stated flux fields attempting to become aligned, causing rotation of the rotor. A propeller may be affixed to the rotor and driven thereby without the use of gears.

DETAILED DESCRIPTION

Figure 1:
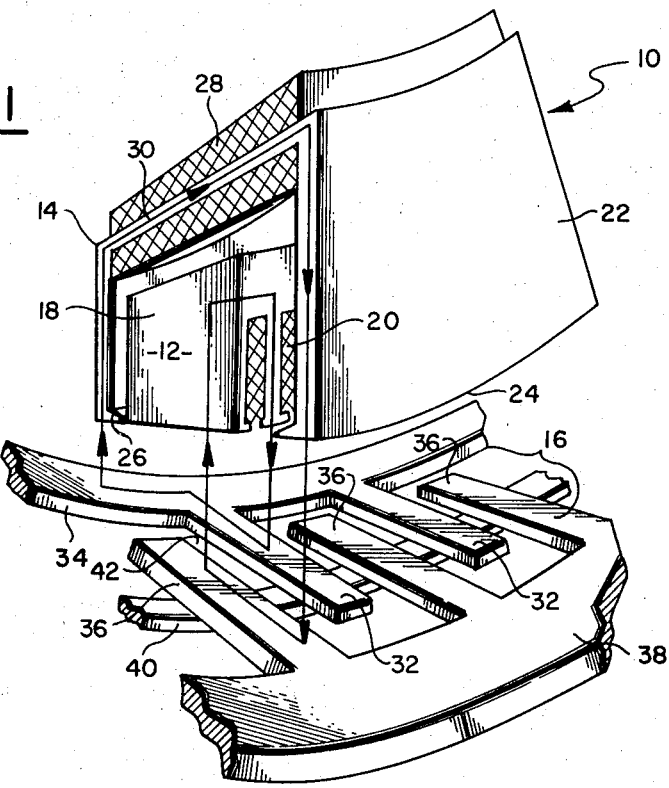
FIG. 1 shows an isolated perspective view of a portion of a motor incorporating the inventive principles in this case.

Referring generally to the drawings described above and particularly to FIG. 1, it may be seen that the invention in this case contemplates a rotational synchronous motor generally designated by reference numeral 10 having stator means 12 cooperatively related with field pole means 14, both being in spaced relationship from substantially cylindrical rotor means 16. Stator means 12 includes a laminated core 18 and stator conductor windings 20 and adapted to produce a flux field passing through the center of core 18. Stator means 12 is located in spaced relationship to field pole means 14 so as not to be magnetically coupled to the field pole means. Both items 12 and 14 are segmented units, not totally surrounding rotor 16. Field pole means 14 has a frame 22 with suitably formed poles 24 and 26 and an excitation coil 28 positioned around the center portion 30 of the frame. It will be understood that frame 22 and pole elements 24, 26 may assume other shapes differing from those illustrated. Moreover, field excitation coil 28 may be replaced in some cases with one or more permanent magnets to provide a field flux in a manner described hereinbelow. The foregoing elements and their operation are more fully disclosed in U. S. Pat. application No. 581,946 filed Sept. 26, 1966 with common inventorship, now U. S. Pat. No. 3,456,136.

As seen from FIG. 1, field pole elements 24 and 26 are of substantially identical shape and contour. Stator means 12 and field pole elements 24 and 26 are spaced from rotor means 16 which is of cylindrical form having a curvature generally corresponding with the curvature of field poles 24 and 26. Rotor 16 may be seen to include a plurality of elongated substantially parallel and spaced apart projections 32 extending from a common support 34, and a corresponding plurality of projections 36 extending from a second common support 38, the stated projections from elements 34 and 38 being interdigitated as shown, for example, in FIG. 1. It will be understood by those skilled in the art that items 32 and 34 constitute a first magnetic member, while items 36 and 38 together constitute a second magnetic member. Both foregoing members are supported in fixed relationship such as by rigid ring 40 permanently joined thereto as seen from FIG. 1 whereby items 32, 34, 36, 38, and 40 effectively comprise a single unitary structural mass rotatable about a center of rotation as described below. An air gap 42 between each of the juxtaposed salient magnet projections 32 and 36 is of sufficient length to substantially eliminate magnetic flux leakage between the stated projections during operation of motor 10. Ring 40 is suitably non-magnetic such as a nickel base alloy, plastic, ceramic, or the like.

Referring to FIG. 1, it will be understood that a magnetic field is created by energization of field excitation coil 28 from a suitable source of direct current. The flux field thus created by coil 28 within center portion 30 of frame 22 will have a shape corresponding generally with the shape of frame 22, and thus will be downwardly directed by pole portion 24 into rotor 16 at a localized area of support 38 or else one of the projections 36. In either case, the flux path passes through at least a portion of the salient magnetic projections 36 and into the stator core 18 due to magnetic force resulting from energization of field coil 28. It will be understood that stator core 18 provides a flux path for a secondary magnetic field created by the stator windings 20 whereby the mentioned flux field is downwardly directed into one of the salient magnetic projections 32. Projection 36 will be understood to have a magnetic polarity opposite from that of projection 32. The flux path then continues through at least a portion of projection 32 and reaches support element 34 and travels therethrough, thence reaching field pole portion 26 and continuing to center portion 30 of frame 22, thus completing the field excitation circuit.

Figure 4:
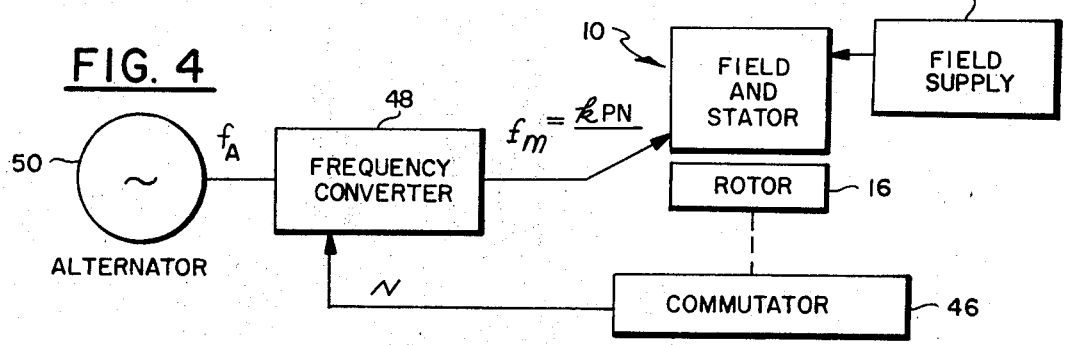
FIG. 4 shows an illustrative arrangement of circuitry for the motor shown in FIG. 1.

Referring more particularly to FIG. 4, operation of motor 10 may be seen to advantageously include a commutator 46 preferably of electromagnetic type, which functions to sense the tangential velocity of rotor 16 relative to stationary stator and field means 12 and 14, respectively, and acts as a position transducer. Commutator 46 provides a speed and position signal of rotor 16 to a frequency converter 48 which is supplied either polyphase electrical power from a conventional source of alternating current such as alternator 50, or a source of direct current power (not shown). When using alternating current, current is supplied to frequency converter 48 at a particular predetermine frequency $f_A$. Frequency converter 48 receives the velocity and position signal from commutator 46 and automatically maintains an applied stator frequency $f_n$ according to the relationship $f_n$ equals $kPN$, where $k$ is a constant of proportionality, $P$ equals the number of pole elements in rotor 16, and $N$ is the tangential velocity of rotor 16. When direct current is supplied, converter 48 converts the same to alternating current at the applied stator frequency $f_n$. Frequency converter 48 applies the variable frequency input $f_n$ to stator means 12 of motor 10 so that the stator means creates a traveling magnetic wave which substantially matches the linear velocity of the flux field generated by field means 14. The foregoing conditions result in a stator magnetic wave and a field magnetic wave which are stationary with respect to each other and are separated by a displacement angle or phase angle delta ($\delta$). Propulsive force results from operation of motor 10 because of the two stated fields attempting to align. The stator magnetic wave normally leads the field magnetic wave, resulting in the mentioned force or thrust between stator means 12 and rotor 16 of motor 10. The operative relationship between commutator 46 and frequency converter 48 is also adaptable to operate motor 10 at a predetermined power factor of unity, leading or lagging in any particular case.

Figure 5:
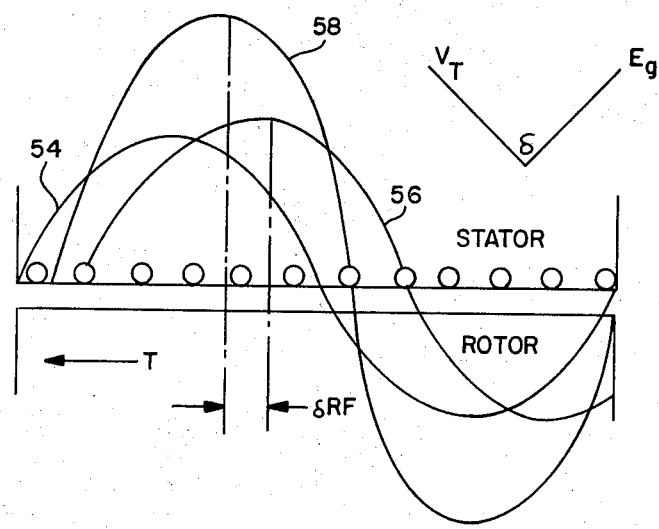
FIG. 5 is a graphic representation of the flux field intensities associated with operation of the motor shown in FIG. 1.

The foregoing relationship between the traveling stator magnetic wave and the fixed flux field produced by field means 14 may be seen more particularly by reference to FIG. 5. The traveling flux field of stator means 12 is indicated by curve 54 and the fixed flux field indicated by curve 56 produce a resultant wave 58. The propulsive thrust or force $T$ is determined according to the relationship:

$T$ equals $k\theta_r F \sin \text{delta}_{rf}$

Wherein $T$ equals thrust, $\theta_r$ designates the amplitude of the resultant wave 58, $F$ equals the magnetomotive force of field wave 56, and $\delta_f$ is the displacement angles between the resultant flux $\theta_r$ and the field magnetomotive force $f$ which is essentially constant and slightly less than 90 electrical degrees. The foregoing relationship results when stator wave 54 and field wave 56 are maintained substantially stationary relative to each other.

The magnetomotive force and the resultant flux $\theta_r$ are directly related to field voltage $E_a$ and stator terminal voltage $V_t$. Thus, the displacement angle $\delta_{rf}$ is maintained substantially constant at any speed or frequency. This condition holds true at the zero or starting condition of motor 10 as well as at any relative movement between rotor 16 and stator means 12. In the starting condition, the frequency is reduced to zero. At zero speed commutator 46 senses the speed and position of rotor 16 while a polyphase current input to frequency converter 48 occurs. The stator current distribution and magnetic wave 54 along the air gap of the stator is approximately sinusoidal and displaced in space from the field magnetic wave 56 by approximately 90 electrical degrees (or other selected angle). At zero speed, stator 54 and field wave 56 are again stationary with respect to each other and separated by a finite displacement. The conditions for positive propulsive force are, therefore, achieved whereby thrust results.

A reversal of magnetomotive force applied to rotor 16 such as to produce reversal of movement direction results by simple reversal of field excitation current applied to field windings 28. The separate source for energizing field windings 28 is suggested in FIG. 7 by reference numeral 52.

Figure 2:
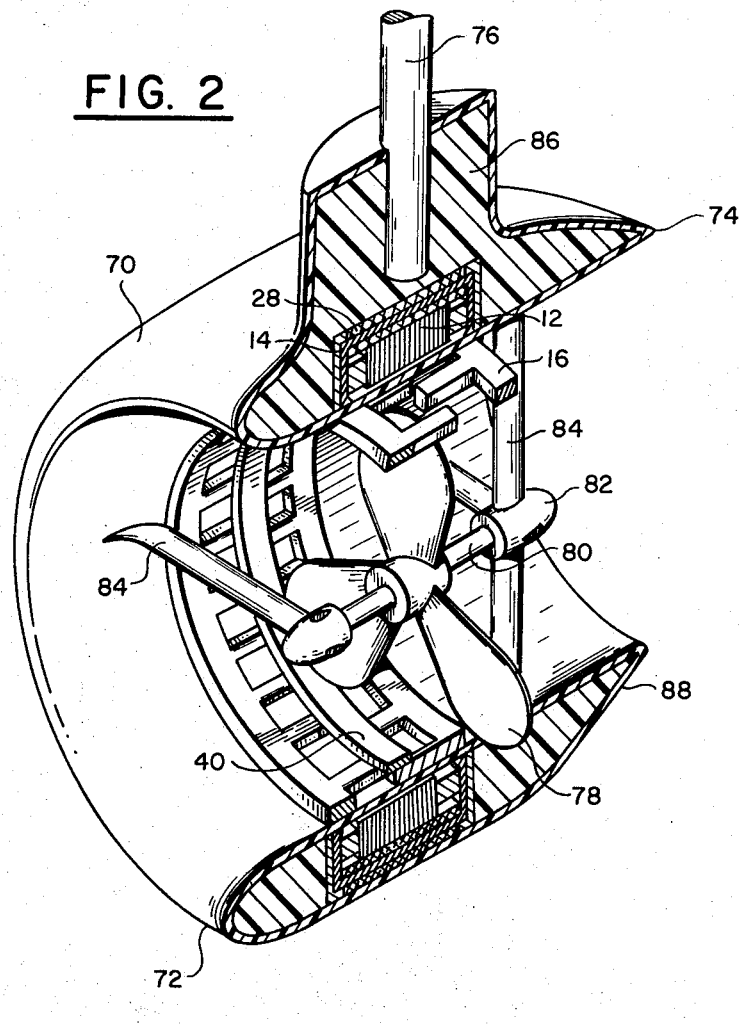
FIG. 2 shows a general perspective view in cross-section showing a propulsion system for boats incorporating the drive motor structure shown in FIG. 1.
Figure 3:
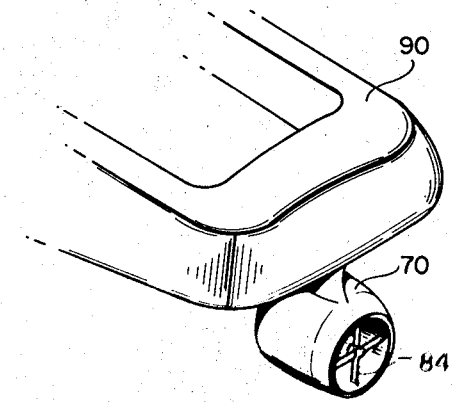
FIG. 3 shows a general perspective view of the structure from FIG. 2 mounted on a boat.

Referring to FIG. 2, the inventive principles and structures discussed above and shown in FIG. 1, for example, may by seen incorporated in propulsion means as shown in FIGS. 2 and 3. The stated propulsion means illustratively comprise an annular housing 70 of suitable low resistance hydrodynamic shape having a leading edge 72 and a trailing edge 74 and affixed to a pivotally movable shaft 76. A propeller 78 is rotatable about an axis of rotation through the lognitudinal center of propeller shaft 80 operatively connected to bearing supports 82 at each end of the shaft. Bearing supports 82 are mounted in stationary relationship with housing 70 by means of two or more struts 84 as suggested by FIG. 2. Each of the blade tips of propeller 78 is permanently affixed to substantially cylindrical rotor element 16 at suitable locations such as by securing the stator blades to rigid mounting ring 40 which in turn is secured to the interdigitated salient magnet projections of the rotor. Stator means 12 and field means 14 are not cylindrical, but segments of a cylinder, and two separate units are situated at diametrically opposite locations about rotor 16 and in spaced relationship therewith in the illustrative embodiment of FIG. 2, the operational relationship between items 12, 14, and 16 shown in FIG. 2 being identical with the corresponding items discussed hereinabove in connection with FIG. 1. However, in the embodiment shown by FIG. 2, stator means 12 and field means 14, together with their various components may be enclosed by any suitable magnetically porous plastic or other lightweight material 86 which in turn is completely encased by any appropriate water-impervious coating 88 as suggested in FIG. 2. Plastic 86, for example, may comprise styrofoam or cellular type plastic, while coating 88 may comprise marine shellac or a thin layer of polyethylene or the like. The structure thus shown in FIG. 2 may be mounted on a boat 90 as shown in FIG. 3 whereby pivital shaft 76 is connected to steering controls in the manner of a rudder. It will be understood that no water proofing of the propeller shaft bearing such as normally required in conventional inboard motor boats is required for shaft 80 in this case, since the shaft does not penetrate the hull. Moreover, it may be seen that directional control is provided in the structure shown by FIGS. 2 and 3 by rotation of shaft 76 even without any forward movement of boat 90 such as would otherwise be required in most rudder installations. Also, where high power is required in any case, additional seg-mental modular units of stator and field coil means 12 and 14 may be used instead of only two.

The embodiment shown herein is characterized by uniformly high starting torque and sustained motive power. In this embodiment, additional segmented or modular units of stator and field winding means 12 and 14 may be conveniently employed instead of merely one or two as shown in the drawings. Illustratively, each segment may comprise about 10° to 20° of the total 360° circle defined by rotor 16 in any case, and a single such segment is sufficient for power applications of moderate demand. In addition to its versatility with regard to power output, the design particularly shown by FIGS. 2 and 3 is especially advantageous as a means for propelling troop transports and warships. Thus, the elimination of gear noise eliminates most of the danger of detection by enemy submarines or impact by torpedoes and the like which depend for search or guidance accuracy upon sonar or other sound-sensing and homing systems. As applied to deep submergence vehicles, the propulsion system shown in FIG. 2, for example, is without operational limits with regard to depth, since no seals are required between a hull and a rotating shaft as with conventional submarines and torpedoes, for example. Thus, extremely high differential pressures may exist between the inside and outside areas of a submerged hull, without producing any of the sealing problems associated with shaft penetration through a hull when the inventive concept of this case is employed. Moreover, the noise, vibration and shock loads associated with large power plants, huge gear trains and long propeller drive shafts in modern passenger ships, especially those effects occurring in heavy seas when the ship's propeller is periodically elevated out of the water between waves, would be very considerably reduced where the drive system shown in FIG. 2 of the accompanying drawings is used.

I claim

1. Gearless drive means comprising:

a linear synchronous motor having a generally cylindrical interdigitated rotor, bearing support means for supporting said rotor rotationally about an axis, said motor further having stator means, said motor also having field pole means operatively associated with said stator means, mounting means for supporting said stator means and said field pole means stationary relatively to said rotor, and propulsion means secured to said rotor and rotatable therewith for propelling said motor along a path of travel, said propulsion means consisting of a marine propeller having a plurality of blades joined to said rotor at the tips thereof, said propeller being rotatable about the same rotation axis as said rotor.

2. A propeller drive system for boats, consisting essentially of:

a generally cylindrical water-impervious housing, means connecting said housing to a boat, a marine propeller axially centered within said housing, said propeller having a plurality of blades, an interdigitated metallic rotor secured to the outer tips of said blades, said rotor having a plurality of substantially parallel spaced apart elongate magnetic projections, segmented stator coil means mounted within said housing and operatively related with said rotor to produce a traveling magnetic wave in said rotor, segmented field coil means mounted within said housing and operatively related to produce a stationary magnetic wave in said rotor, bearing support means connected to said housing for supporting said propeller rotationally relative to said housing and with said rotor spaced-apart from and in close juxtaposition with said housing, and electrical power connection means for supplying said stator coil means with electrical current of predetermined frequency.

* * * * *